United States Patent [19]
Lake, Jr.

[11] 3,923,188
[45] Dec. 2, 1975

[54] SATELLITE PROPELLANT MANAGEMENT SYSTEM

[75] Inventor: Ralph Jones Lake, Jr., Willingboro, N.J.

[73] Assignee: RCA Corporation, New York, N.Y.

[22] Filed: Dec. 12, 1973

[21] Appl. No.: 426,667

[52] U.S. Cl................................ 220/20; 220/22
[51] Int. Cl................................... B65d 85/00
[58] Field of Search...................... 220/20, 20.5, 22

[56] References Cited
UNITED STATES PATENTS

| | | | |
|---|---|---|---|
| 2,703,607 | 3/1955 | Simmonds | 220/20.5 X |
| 3,246,788 | 4/1966 | Meyer | 220/20 X |

Primary Examiner—William I. Price
Assistant Examiner—Steven M. Pollard
Attorney, Agent, or Firm—Edward J. Norton; Joseph D. Lazar

[57] ABSTRACT

A storage system for a two-phase propellant fluid to provide a simple passive propellant storage device for dispensing in gas-free form the liquid propellant for use typically in an auxiliary propulsion system in a three-axis stabilized spacecraft. The internal structure of the storage tank of the system is formed into three compartments which by capillary action provides for preferrential flow of a selected one of the two fluids, comprising, typically, a pressurant gas and a two-phase propellant liquid.

6 Claims, 9 Drawing Figures

SATELLITE PROPELLANT MANAGEMENT SYSTEM

CROSS REFERENCE TO RELATED APPLICATIONS

Of interest are the following copending patent applications, Ser. No. 221,955 filed Jan. 31, 1972, entitled "A Dual Thrust Level Monopropellant Spacecraft Propulsion System," based on the invention of Y. C. Brill, and Ser. No. 246,525 filed Apr. 24, 1972, entitled "Storage System for Two Phase Fluids," based on the invention of Daniel Lee Balzer and Ralph Jones Lake, Jr., both of which applications having been assigned to the same assignee as the present application.

BACKGROUND OF THE INVENTION

1. Field of the Invention

This invention is directed to an improved fluid storage tank and more particularly to a two fluid storage tank adapted to dispense a continuous supply of a selected one of two fluids.

2. Description of the Prior Art

In orbiting a satellite in space consideration must be given to maintaining its attitude or position relative to a given reference in space. In order to alter or maintain this position in space auxiliary propulsion systems are provided which develop thrusts in the order of five pounds or less. A typical auxiliary propulsion control system is described in copending U.S. application, Ser. No. 221,955 filed Jan. 31, 1972, entitled "A Dual Thrust Level Monopropellant Spacecraft Propulsion System," based on the invention of Y. C. Brill, assigned to the same assignee of this patent application.

Such auxiliary propulsion control systems must provide a reliable uniform, efficient, and accurately controlled expulsion of propellant from a storage tank to thruster engines. When a liquid propellant such as hydrazine is used, provision must be made to prevent mixing a pressurant gas such as nitrogen in the expelled liquid propellant. Any gas ingested into the liquid propellant and expelled with the propellant causes erratic and inconsistent thrusts from the thruster engines. To avoid the deleterious effects of mixing the inert nitrogen gas pressurant with the hydrazine propellant, a supply of gas-free liquid propellant must be continuously available over the outlet of the propellant storage tank for transfer to the thruster engines.

The problem of dispensing a gas-free liquid propellant becomes particularly acute at terminal drain when there is a relatively small amount of liquid propellant remaining in the storage tank with the major part of the inside volume occupied by the inert gas pressurant.

The propellant storage systems presently available may be classified in two general categories of being either passive or active. The active systems, e.g. elastometric bladders, metallic diaphragms, bellows, and pistons often are complex in structure, cycle life limited, heavy in weight, and experience difficuly in dispensing the fluid at terminal drain. Passive systems of the type such as described in copending U.S. application, Ser. No. 246,525 filed Apr. 24, 1972, entitled "Storage System for Two Phase Fluids," based on the invention of Daniel Lee Balzer and Ralph Jones Lake, Jr. depend on pressurized gases for propelling a liquid from a container. To provide a gas-free liquid propellant use of undesirable separation membranes is often times required. A storage system of the passive type is needed to overcome the deficiencies of the presently known systems.

SUMMARY OF THE INVENTION

According to the present invention, a fluid storage container is provided for dispensing a selected one of two fluids from the container continuously on demand until the selected fluid is substantially depleted. The container has an input port for admitting the fluids and an outlet port for withdrawing the selected fluid. The container includes means for dividing the inner volume of the container into first, second, and third portions and means for providing fluid communication between the first, second, and third portions comprising first and a second size foraminous material and means to assure full depletion of the selected fluid from the third portion without contamination by the other fluid.

DETAILED DESCRIPTION OF A PREFERRED EMBODIMENT

The present invention is based on the principle of capillary phenomenon of fluids. As is known in the art, when a wetting liquid is in contact with a wettable foraminous material, such as a suitable screen, the capillary forces cause large surfaces of the surface to be wetted by the liquid even though the screen is only partially immersed in the liquid. A meniscus interface will exist between the wetting liquid and a gas pressurant at each non-immersed pore of such foraminous material because of the capillary effect. Such an interface or barrier has sufficient strength, by virtue of the phenomenon of surface tension and adhesion between the liquid and the foraminous material, to withstand a pressure differential which would otherwise be sufficient to cause a gaseous flow of the pressurant through the pores. This pressure differential established at the apertures or pores of the screen is the threshold pressure of the pressurant gas which is needed to penetrate such a liquid barrier. The magnitude of the pressure is inversely proportional to the size of the apertures or pores of the mesh of foraminous material.

As is well known, the capillary barrier created in the pores of wetted screen is caused by the intermolecular cohesive forces that occur at the discrete boundary between two immiscible substances or two phases of the same substance, The surface tension of two intermolecular fluids such as a gas and a liquid act as though there were a thin elastic membrane of substantially uniform tension at the surface of the fluid with the greatest coherent molecular forces, which, for a liquid-gas arrangement, is the liquid.

A preferred embodiment of the invention in a force environment of low or zero-g field is in the form of a spherical storage tank 10 (FIG. 1) containing two fluids, one an inert pressurant gas, such as nitrogen, and the other a liquid propellant, such as hydrazine. The environment is considered a low or zero gravity field when the statics or dynamics of a system relative to its traveling vehicle can be treated as though it were in fact a low acceleration field, as, for example, occurring in an oribiting spacecraft.

It should be understood, nevertheless, that the invention is not limited for its utility to a low or zero gravity field environment. As will become apparent in the description to follow, the invention may be practiced in any acceleration environment provided the fluids used have appropriate relative densities. In the preferred embodiment such as in the environment of an orbiting spacecraft, the low or zero-g system thereof eliminates the effect of differential weight (density) of the gas and the liquid. In the absence of the effect of the differential weight factor of the two fluids in a low gravity environment or compensating for gravity effect by selecting appropriate relative densities of the fluids, the surface tension at the fluid interface becomes the dominant force which orients the two fluids and prevents their mixing. According the the present invention, once the fluids are properly oriented in the storage tank, the pressure of the gas acts to expel the (propellant) liquid from the tank 10 for distribution to a user device such as the thruster engines of an auxiliary propulsion system of a spacecraft.

Figure 1:
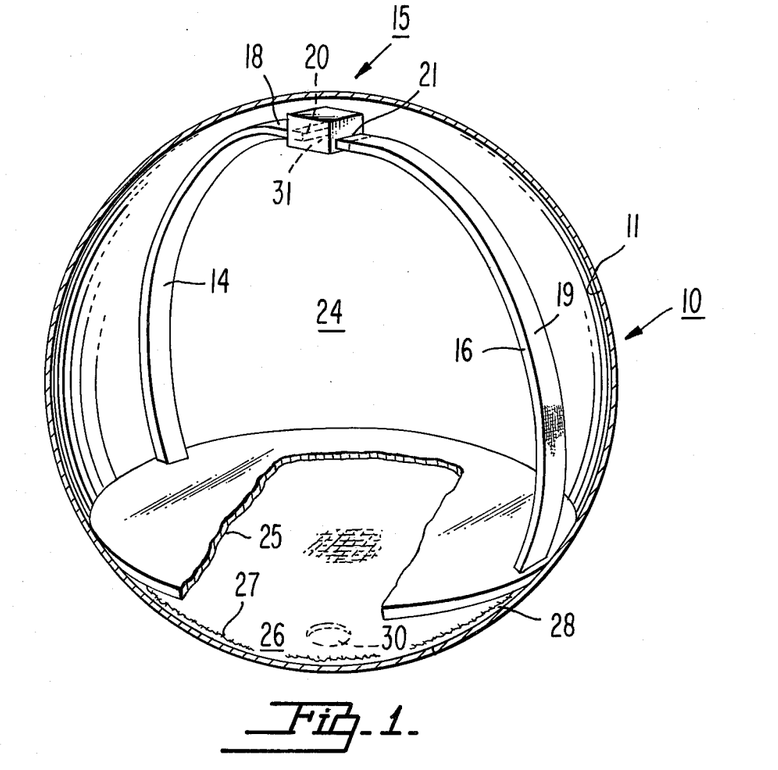
FIG. 1 is a perspective view partly in section of a spherical storage tank embodying the invention.

FIG. 1 shows in perspective a storage tank 10 in the form of a hollow spherical shell of uniform thickness having an inner surface 11 and in internal structural assembly to be described. The following description refers to the storage tank 10 shown in the FIGS. 1, 2, and 3 which are three different views of storage tank 10 wherein like references indicate like elements. The storage tank shell 10 and the internal assembly are made of a suitable material such as stainless steel which exhibits a high degree of wettability to the liquids used. At the upper portion of the tank 10 there is provided a circular input port 15 adapted to pass the fluids to the interior of the storage tank 10. The lower portion of the spherical tank 10 includes a circular shaped aperture serving as an output port 30 for the preferential expulsion of only one of the fluids as will be described. Although the input port 15 and the output port 30 are shown as circular shaped apertures, any suitable form or structure may be provided. The ports 15 and 30 are suitably diametrically positioned in accordance with the desired output of the liquids.

Figure 2:
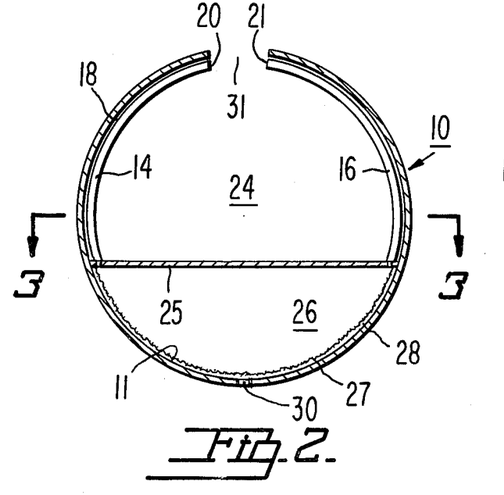
FIG. 2 is a side elevation in section of the storage tank of FIG. 1.
Figure 3:
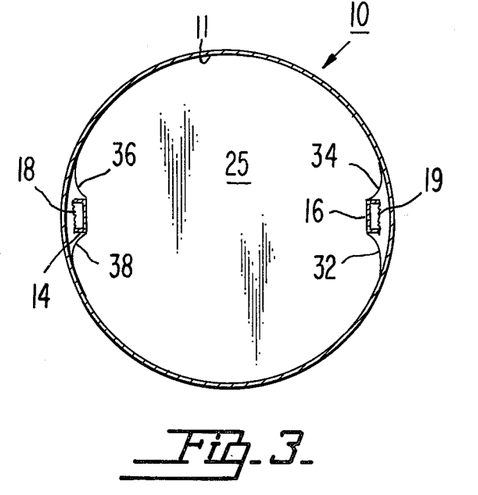
FIG. 3 is a sectional top view of the storage tank of FIG. 2 as seen along viewing lines 3—3 thereof, showing the form of the liquid fillets.

The internal assembly is arranged generally to divide the interior of tank 10 into three separate compartments; an inlet compartment 24, an inner compartment 26, and an outlet compartment 28. The inlet compartment 24 is separated from both the inner compartment 26 and the outlet compartment 28 by a preferably solid barrier plate 25, suitably a circular disc made also as the other members of a material which exhibits a high degree of wettability such as stainless steel. Plate 25 alternatively may also be porous as will be described. Barrier plate 25 is affixed to the inner surface 11 of the storage tank 10 to maintain liquid between the inlet compartment 24 and either the outlet compartment 28 or the inner compartment 26 with liquid replacement provided through apertures in feeder tubes 14 and 16 to be described. Barrier plate 25 is sufficiently thick to afford rigid support to the shell of the tank 10 and yet not so thick as to affect unduly the total weight of tank 10.

The two feeder tubes 14 and 16 are arcuate tubes of any suitable cross-section, but preferably rectangular, positioned in close proximity to the inner surface 11 of tank 10 extending from the inlet portion 15 along the inner surface 11 of the tank 10 to and terminating at the barrier plate 25, and uniformly spaced from the inner surface 11 by a gap distance L.

Barrier plate 25 has two apertures through which each of feeder tubes 14 and 16 provide a liquid communication link between inlet compartment 24 and inner compartment 26. Inner compartment 26 and outlet compartment 28 are defined by and separated by screen shell 27 of foraminous material. The screen shell 27 is the shape of a portion of a sphere suitably affixed for stuctural support to the barrier plate 25. The foraminous material may be a screen mesh of a relatively fine grade having, for example, holes or pores 30 microns in diameter and made of a suitable material which provides good wicking action. Screen shell 27 is preferably designed so that the space between the inner surface 11 and the shell 27 is uniform.

The size of the three compartments 24, 26, 28, in the design just described are determined by the particular spacecraft mission requirements. The feeder tubes 14 and 16 to be described extending from the tank inlet 15 to the barrier plate 25 are used to maintain propellant communication from the main tank reservoir to the second compartment 26 under the barrier plate. The secondary compartment 26 is used as a final gas trap to prevent any gas accumulation from entering the outlet compartment 28 and also to insure a redundant mode of operation to be described. The third compartment 28 is (propellant) liquid-filled and is the last to empty. When all liquid except that in the outlet compartment is expelled, according to the structural arrangement of the invention, gas penetrates the perforations and the expulsion is complete.

Feeder tubes 14 and 16, as described above are preferably rectangular in cross section with their respective surfaces 18, 19 adjacent to the inner wall 11 made of a foraminous material exhibiting a high degree of wettability, such as, for example, a screen of woven strands of 165 × 800 stainless steel, commonly known as a Dutch Twill weave.

Screen surfaces 18 and 19 of feeder tubes 14 and 16 being adjacent to the inner wall 11 provide a good liquid communication during the terminal drain of the liquid. The upper end of each of the feeder tubes 14 and 16 terminate in a screen or perforated plate pairs 20 and 21, respectively, and joined to a flow nozzle for communication to inlet port 15.

Each of plate pairs 20 and 21 comprise two perforated plates having, suitably, holes of 0.005 inches in diameter spaced by a capillary gap of 0.02 inches. The inlet flow nozzle 23 receives the platepair ends 20 and 21 of the tubes 14 and 16 to support the tubes with a substantial clearance or gap between the respective ends of the tubes, the gap not being dimensionally related to capillary action as is the gap between the two plates forming the respective end plate pairs.

The lower ends of tubes 14 and 16 are open and suitably affixed to the barrier plate 25 as previously described.

Plate 25 separating chamber 24 from chambers 26 and 28 is preferably solid as explained above except for the apertures for receiving the ends of tubes 14 and 16. Plate 25 may be formed of a suitable plate with aperture or screening therethrough or it may be formed entirely of screening. The size or aperture of holes of such a foraminous wall is that they be smaller than either of the holes of the end of tubes 14 and 16 or the side wall portions 19. The principle or criterion determining the size of the holes is dependent upon the capillary principle as will be described.

Figure 4:
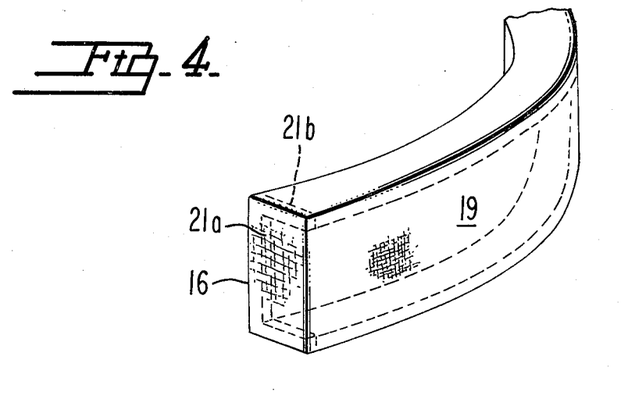
FIG. 4 is an end view in section of a fragment of one of the feeder tubes.

The purpose of providing a screen surface (18, 19) on at least one of the sides of the rectangular shaped channels of the feeder tubes 14 and 16 is to prevent any premature gas ingestion into the liquid communication links feeder tubes 14 and 16 between compartments 24 and 26 while allowing liquid flow into the perforated side wall of the channel tube. FIG. 4 shows an end view of the feeder tubes 16 with perforated plates 21a and 21b and the screen surface 19. As previously discussed, wetted screens 18 and 19 and the perforated plate pairs 20a/20b and 21a/21b create a meniscus interface between the wetting liquid and the pressurant gas of sufficient strength by virtue of the phenomenon of surface tension and adhesive force to withstand a certain level of pressure of the gas without allowing any flow of gas through the apertures of the perforated plate pairs 20 and 21, or screens 18 and 19. This gas/liguid interface is maintained until substantially all the liquid contacting the outside of the feeder tubes 14 and 16 is expelled from the inlet compartment 24.

Once substantially all the liquid contacting the feeder tubes 14 and 16 is drained from the inlet compartment 24 the end perforated plate pairs 20 and 21 should ingest the gas first before any gas is ingested at the screen surfaces 18 and 19 so that substantially all the liquid contained in the feeder tubes 14 and 16 is drained. The provision of the gas being ingested at the end plate pairs 20 and 21 first, prevents any creation of gas bubbles in the liquid within one of both feeder tube 14 and 16 by ingestion through the screen surfaces 18 and 19 thereby separating a portion of the liquid communication link leading to the inner compartment 26. Once this separation of the liquid occurs within the feeder tube 14 and 16, the separated liquid segment may not be drained from the storage tank 10.

To assure that perforated plate pairs 20 and 21 ingest the gas before gas is ingested through the side screen surfaces 18 and 19 of the feeders 14 and 16, the apertures of the perforated plates 20 and 21 are selected to be larger in size than those of the feeder screen surfaces 18 and 19 as shown in FIG. 4.

Figures 5, 6, 7:
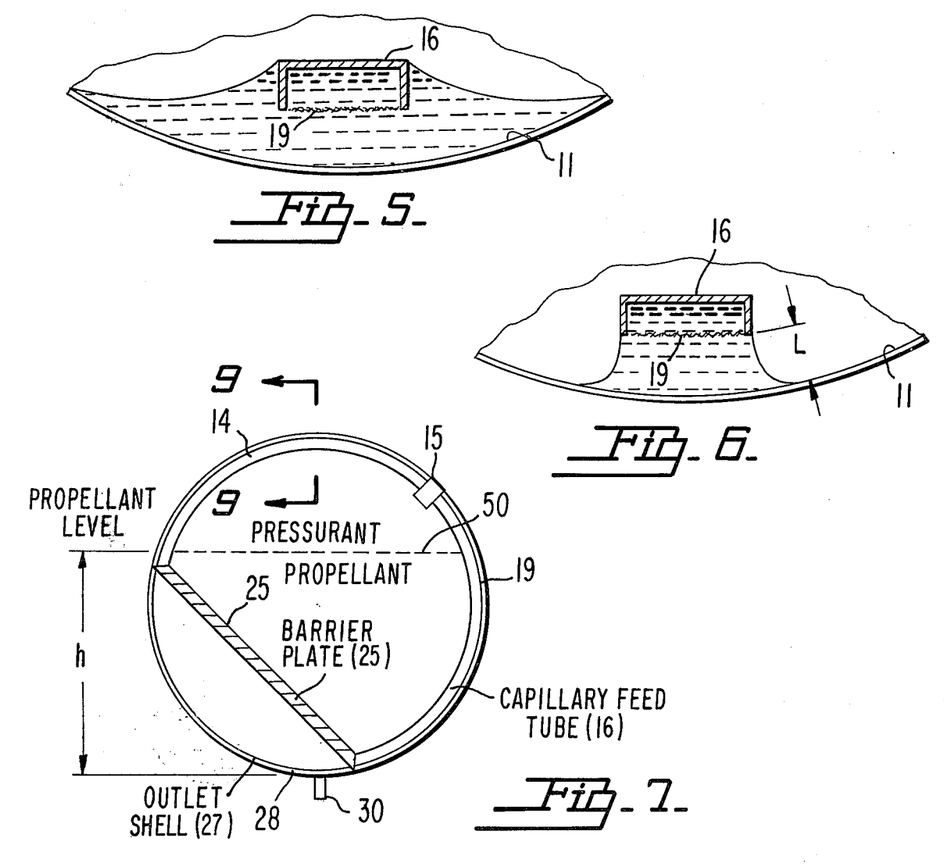
FIGS. 5 and 6 are fragmentary views of the feeder tube tank in different modes of operation.
FIG. 7 is a schematic of the assembly in operating position.

FIG. 5 illustrates the orientation of the final remaining portion of the liquid propellant during a zero-g environment during which such period the propellant is still supplied at a constant feed rate. During thrust periods, however, the depleted volume of fluid is reoriented and a fillet of the form shown in FIG. 6 is established, remotely from the bulk liquid portions. This fillet still allows for liquid propellant to flow through the wall portion 19 of tube 16 to flow to chamber 26 and then to chamber 28. To determine the aperture sizing of the screen surfaces 18 and 19 relative to the sizing of the perforated plate pairs 20 and 21, the capillary retention capability for various foraminous materials must be considered. Guidelines concerning the static and dynamic retention capabilities of various screens and perforated plates may be found in the publications:

"Design Guide for Surface Tension Positive Expulsion Tankage," by C. A. Armontraont, Bell Aeorsystems, published in 1968 and "Research Task 631" by Martin Marietta Corporation published in Apr., 1969.

The following is a brief review of the design considerations discussed in detail in the aforementioned publications, to determine the sizing of the screens. Surface tension of a liquid, which is referred to as $\sigma$, is created by the intermolecular forces which occur at the discrete boundary between two substances and/or two phases of the same substance. Young's Equation which may be expressed as follows:

$$\Delta P = \sigma \cos \theta \left( \frac{1}{r_1} + \frac{1}{r_2} \right) \quad (1)$$

where $\sigma$ is the Surface Tension, $\theta$ is the Solid-Liquid Contact Angle, $r_1$ is the Radius of Curvature in one direction, $r_2$ is the Radius of Curvature in a second direction, and $\Delta P$ is the pressure gradiant across the two phase interface, describes the force system developed at a gas/liquid interface across a gap in a solid material. For circular openings, Equation 1 can be simplified, thus defining the Equation in the design of capillary systems as:

$$\Delta P_c = \frac{2\sigma \cos \theta}{r} \quad (2)$$

The basic design criteria for capillary systems may be expressed by the Equation:

$$\Delta P_c = \Delta P_{st} + \Delta P_f + \Delta P_{vh} \quad 3$$

where $\Delta P_c$ is the pressure gradient across the capillary pore, which is a measure of the surface tension retention capability of the screen $\Delta P_{st}$ is the acceleration head exerted on the liquid, $\Delta P_f$ is the friction flow loss through the screen and $\Delta P_{vh}$ is the velocity head.

To assure that the end perforated plate pairs 20, 21 are the first sections to ingest the gas, the surface tension $\Delta P_c$ of the perforated places 20, 21 must be less than the $\Delta P_c$ of the screen surfaces 18, 19 by approximately, for example, a factor of 3.

Another consideration to assure a complete terminal drain of the liquid from the inlet compartment 24 concerns the dimension l for the feeder tubes 14 and 16 that are spaced from the inner wall 11 of the storage tank 10. Dimension L is a system parameter and depends on the maximum acceleration forces which are expected to be experienced by the system, the value of which will be described below.

The purpose of the gap L between feeder tubes 14, 16, and the inner surface 11 of storage tank 10 is to establish a capillary reservoir so that the last remaining liquid in the inlet compartment 24 fills the gap space L thereby maintaining such remaining liquid in contact with screen surfaces 18, 19 of the feeder tubes 14, 16 for draining into the inner compartment 26 through the feeder tubes 14, 16.

The last liquid remaining in inlet compartment 23, in a low or zero acceleration environment, orients itself to form the least amount of surface area of the liquid exposed to the gas. A detailed discussion of the principles of the dynamic behavior of fluids may be found in the National Aeronautics and Space Administration (NASA) publication, entitled, "The Dynamic Behavior of Liquids in Moving Containers," by H. Norman Abranson, particularly chapter 11. As discussed in that NASA publication a dimensionless number which is a measure of the forces acting on a liquid is known as the Bond Number, $B_0$. The Bond Number is a measure of the relative magnitudes of gravitational and capillary forces, and is the pertinent parameter delineating capillary-dominated and gravity-dominated hydrostatics.

The principal physical parameters effecting capillary forces of fluid orientation are: (1) the contact angle ($\theta$); (2) the surface tension ($\sigma$); (3) the fluid density ($\rho$); (4) the maximum accleration ($a$) which would be experienced by the system, and (5) the gap dimension (L). The contact angle ($\theta$) is a measure of the wettability of the solid structure of the liquid. The wettability is substantially 100% in a system of a liquid propellant such as hydrazine in a stainless steel storage tank 10.

For Bond Numbers $B_0$ much less than 1, capillary forces predominate, and, thus, the liquid orients itself into the reservoir created by gap L and forms fillets 32 – 38 between the sides of the feeder tubes 14, 16 and the inner surface 11 of the storage tank 10 as shown in the sectional view in FIG. 3 references 32, 34, 36, and 38.

An example of a passive system is found in the co-pending application 246,525 filed Apr. 24, 1972, and assigned to the same assignee of this application.

Fillets 32–38 are maintained assuring constant availability of the liquid to the screen surfaces 18, 19 of the feeder tubes 14, 16, by sizing the gap L for a Bond number less than one, according to the relation:

$$B_o = \frac{\rho L^2 ag}{\sigma} \qquad (4)$$

Thus, for a worst-case condition of a 0.02-g acceleration, equation 4 yields a tube-to-wall gap L of 0.126 inches. Using about a 25% safety margin, the feeder-to-wall gap dimension is approximately 0.10 inches.

In operation, two fluids, one suitably gaseous nitrogen, serving as a pressurant, preferably at 400 psi, and a liquid such as hydrazine, serving as the propellant for the auxiliary propulsion system are received into the tank through the inlet port 15.

The liquid propellant selected should be of the type which has a high degree of wettability when in contact with inner surface 11 of storage tank 10, feeder tubes 14 and 16, barrier plate 25, and shell 27. As discussed previously, the degree of wettability of a particular liquid on a particular solid surface, as known in the art, is determined by the liquid-to-surface contact angle $\theta$, the contact angle $\theta$ being the angle the surface of the liquid makes with the surface of the solid. Most common propellants are wetting (i.e. $\theta << 90$) on the surface of metallic tanks with a near-zero-degree contact angle.

The fill cycle of the preferred embodiment begins with the evacuation of all fluids (e.g. gas and a liquid) from the storage tank 10 by a vacuum device, not shown. A predetermined amount of liquid hydrazine is then added to the storage tank 10. If the fill cycle is accomplished in a gravity environment, the storage tank 10 is positioned such that the output port 30 is at the lowest most point thereby filling the outlet compartment 28, the inner compartment 26, and at least partially filling the inlet compartment 24 with liquid hydrazine. Since the interior of the tank 10 was a vacuum before injection of the liquid, the possibility of trapping gas within the liquid, or more accurately the inner 26, and outlet 28 compartments is substantially eliminated. The fill cycle is completed with the injection through the inlet port 15 of the gas pressurant.

When the storage tank is moved, as by a launch, from a gravity environment to a zero or low acceleration environment, the liquid in the inlet compartment 24 reorients itself in a position which forms a shape which may be termed a "free surface minimum energy configuration." In a zero gravity or a zero acceleration environment, it is the surface tension force of the liquid which acts on the volume of liquid to orient it into the shape or form manifesting a free surface minimum energy configuration. The liquid orients itself in the tank such as to assume the position and shape within a given portion of the compartment which produces the least amount of surface area of the gas and liquid interface. For example, if the inlet compartment 24 were spherical in shape and did not have any internal structures such as the feeder tubes 14 and 16, the liquid would orient itself to form a spherical gas bubble the spherical shape of the gas bubble, it should be understood, being the form which manifests the minimum surface area of gas/liquid interface for a given volume. As the force environment changes from a gravitational or high acceleration force to a zero or low acceleration force, the liquid moves up the feeder tubes 14 and 16 faster than the bulk liquid propellant in the inlet compartment 24 moves up the sides of the inner surface 11. This causes the gas in the feeder tubes 14 and 16 to be purged out the end plate pairs 20 and 21 thereby filling the feeder tubes 14 and 16 completely with liquid. The reasons for this will become evident from the following discussion. As discussed previously, when the tank is used in a propulsion system of a spacecraft, the propellant must be available on demand at the outlet port 30 independent of spacial orientation and independent of the volume of liquid remaining in the tank. A description of the various stages in the expulsion of the liquid from the storage tank 10, taking into account the effects of the changing proportions of the gas and liquid, will demonstrate the advantages of the present invention. The compartmentalized structure is arranged to communicate the liquid between the compartments and the interreaction between the liquid and the surfaces in the storage tank according to the invention produces a highly efficient expulsion of the liquid.

At the start of liquid withdrawal in a low or zero gravity environment, outlet compartment 28, inner compartment 26, and the feeder tubes 14 and 16 are completely liquid filled as previously discussed. No gas was allowed to be ingested through the screen surfaces 18 and 19 or the end perforated plate pairs 20 and 21 of the feeder tubes 14 and 16 because of the capillary barrier established in the pores or apertures of the screen and the spacing of the plate pairs.

As liquid is withdrawn on demand from outlet port 30, there is a flow of liquid to replace the withdrawn liquid from the inlet compartment 24 to the inner compartment 26 by means of the feeder tubes 14 and 16 and from the inner compartment 26 to the outlet compartment 28 through the screen shell 27.

As liquid is withdrawn from inlet compartment 24, the form of the gas/liquid interface changes its shape in response to the expanding volume of gas over the surfaces of the structure within the inlet compartment 24 (i.e. inner surface 11 of the tank 10, barrier plate 25 and feeders 14 and 16) functioning thereby as though the interface were a thin expanding membrane of uniform tension between the liquid and the gas.

When the ullage (gaseous portion) of the inlet compartment 24 exceeds the void of the interior open portion defined by the inner radius of the feeder tubes 14 and 16, the liquid, because of its high degree of wettability, wets the inner surface 11 of the tank 10, the upper surface of the barrier plate 25, and the surfaces of the feeder tubes 14 and 16.

The liquid tending to orient itself to form the minimum surface energy configuration, fills the gap space between the feeders and the inner wall of the tank and forms fillets (32, 34, 36, 38) between the side surfaces of the feeder tubes 14 and 16 the inner surfaces 11, as shown in FIG. 3 of the sectional view 3—3 of the tank 10. As discussed previously, the fillets assume the shape which produces the minimum gas/liquid interface surface area. The surface tension of the liquid tends to orient the liquid to the areas of the tank which contains the largest volume of liquid for the least amount of surface area of the gas/liquid interface. This means that as more liquid is withdrawn from the inlet compartment, the liquid remaining in the inlet compartment 24 fills the gap between the feeder tubes 14 and 16 and the inner surface 11 until even this remaining liquid (e.g. the small amount of liquid between the feeder tubes and the tank wall) is drawn into the feeders. Thus, as the fluid is depleted, the fillets between tubes 14 and 16 changes as shown from FIG. 5 to that of FIG. 6.

As long as there is liquid in contact with screen surfaces 18 and 19 of feeder tubes 14 and 16, substantially no gas is ingested into feeder tubes 14 and 16 during the withdrawal of liquid from the inlet compartment 24. When the liquid is substantially depleted from the inlet compartment 24, except for that liquid remaining in the feeder tubes 14 and 16, the gas at this point will be ingested preferentially into the feeder tubes 14 and 16 through the perforated plates 20 and 21 before any portion on the screen surfaces 18, 19 thereby assuring efficient terminal drain of all the remaining liquid. As mentioned previously, the preference of the gas to be ingested through the perforated plates 20 and 21 rather than the feeder screen surfaces 18 and 19 is achieved by the apertures of the perforated plates 20 and 21 being made larger in size than the apertures of the side screen surfaces 18 and 19. The design formula for calculating the proportional sizes of these apertures is found in Equation 3, as described previously.

Upon ingestion of the gas through the perforated plate pairs 20 and 21, a stable capillary interface forms and moves down the feeder tubes 14 and 16 as the liquid is withdrawn. Gas continuously enters as long as liquid is expelled from the outlet compartment. If the expulsion is interrupted at any time, no more gas enters and no liquid will flow back to the inlet compartment because the screen surfaces remain wet and maintains the capillary interface.

Once the feeder tubes 14 and 16 are depleted of all liquid, the only remaining liquid is in the inner compartment 26 and outlet compartment 28. Separating these two compartments is a foraminous screen shell 27 which serves as a final means of preventing gas from being mixed with the expelling liquid. The outlet screen shell 27 functioning thus as a gas barrier being concentric in shape and made of a screen has a pore size determined as an approximation of equations 2 and 3 neglecting $\Delta P_f$ and $\Delta P_{vh}$:

$$\Delta P_{st} = a\rho h = \frac{2\sigma \cos\theta}{R} \qquad (5)$$

with the static head term $h$ being the maximum height across the shell diameter and R being the capillary pore radius.

As the liquid is expelled from outlet port 30 a gas bubble is formed in the inner compartment 26 replacing this expelled liquid. The gas/liquid interface, forming its "free surface minimum energy configuration" (described above) continues to expand in much the same manner as was discussed for the liquid withdrawal phase of the inlet compartment 24. Gas is prevented from being ingested into the outlet compartment 28 through the outlet screen shell 27 by the capillary barrier created by the wetted screen until essentially all the liquid is withdrawn from the inner compartment 26.

Once all the liquid is withdrawn from the inlet compartment 24 and inner compartment 26, gas begins to enter the outlet compartment 28. At this point, gas could enter the outlet flow of liquid so the expulsion of gas-free liquid is essentially complete. Accordingly, the outlet compartment 28 is therefore volumetrically minimized to maximize the expulsion efficiency. For the configuration of the preferred embodiment, the expulsion efficient is in the order of 98%.

Reference is made of FIG. 7 which is a schematic of the storage system showing an operative position when a spacecraft carrying the container is launched whereby high-g loads cause the propellant fluid to be oriented in the container as shown. The liquid propellant is disposed in the container in the portion indicated beneath the interface line 50, the gaseous pressurant being disposed above that interface as shown. The level of the propellant is h as indicated in the schematic. The volume of the capillary tubes above the interface 50 is filled with the pressurant gas. After launch, low-g or zero-g accelerations are realized and the outer screens 19 of the capillary tubes 16 and 14 are completely wetted due to wicking action. The tubes are also filled due to capillary action and purge all entrapped gas out of the end screens or end walls 21 and 22.

Figure 9:
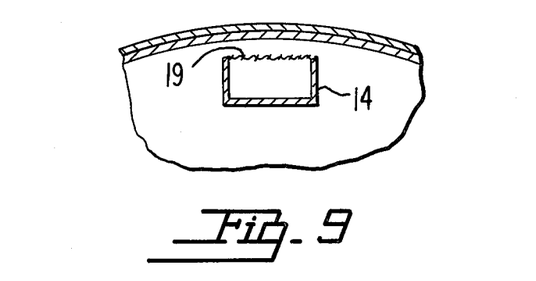
FIG. 9 is a section 9—9 of FIG. 7.

FIG. 9 is a sectional view as seen along section 9—9 showing the relation of the capillary tubes 16 to the inner surface of the container 11.

Figure 8:
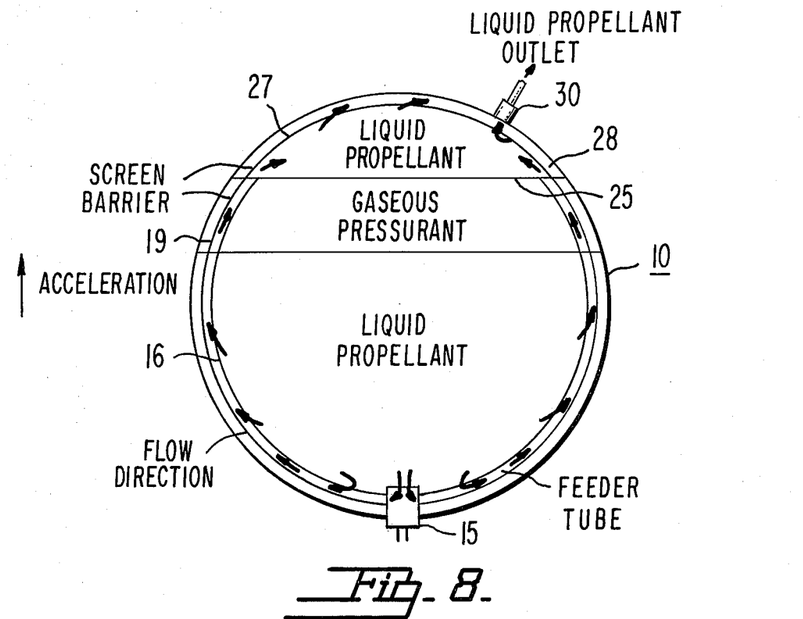
FIG. 8 is a schematic showing the flow of the liquid.

FIG. 8 is a schematic of the system showing the flow of the liquid fluid from the inner three compartments through the outlet 30 as indicated by the arrows. This flow is continuous on demand and will continue until all of the liquid fluid is exhausted before any of the gaseous propellant is mixed with the liquid or expelled through outlet 30 as described above.

It is to be noted that the gaseous pressurant is combined in band form across the container as shown in FIG. 8 with substantially linear or planar boundaries. This form will be defined in an acceleration mode. However, when low-g accelerations occur the pressurant is of irregular form generally spherical or oblate spheroid and can exist in such form without contacting the surfaces of the tube or container.

As mentioned previously, the invention is not limited in use to a low or zero gravity field. By matching the densities of two immiscible liquids, the fluid interface is dominated by the surface tension forces, as occurs in a zero gravity or space environment. It is known that, as the density of the two fluids is balanced, the Bond Number will approach zero ($B_0$-0).

Thus, if the Bond Number ($B_0$) is arranged by the appropriate selection of the physical parameters, i.e., make the relative densities of the two fluids equal, to be near or at zero, the capillary (surface tension) forces are dominating, while the environmental forces have little or no effect on the interface of the fluid.

According to a feature of the invention, by balancing the densities of two immiscible liquids within the storage tank 10, a condition, which may be termed "neutral buoyancy," is achieved negating the effect of gravity at the liquid interface. Accordingly, the use of equal density fluids allows the practice of the invention at different acceleration fields.

The most common technique for testing the operation of a device in a low or zero-gravity environment is free-fall testing. A free-fall test consists of dropping a test device such as a storage container made according to the present invention from a predetermined height and allowing it to fall undisturbed to earth. Since all elements of the system are being accelerated at the same rate, the relative gravity-induced forces between the liquid, gas and container are zero. This procedure of free-fall testing is applicable to both static and dynamic conditions. A disadvantage of this technique is the limited test time available with practical free-fall heights. A height of 100 feet yields a free-fall time of only 2.6 seconds. The time required for liquid reorientation from its initial one-g configuration to a low-g condition is a constraint to limit the model sizes to small dimensions of less than six inches in diameter.

A more practical approach for either simulating a zero-gravity environment or operating the present invention in a one-g environment is the "neutral buoyancy" technique described above. This technique also may be used to demonstrate certain types of low-g dynamic characteristics of a system by controlling the mismatching of the densities of the two fluids. In practice of the "neutral buoyancy" procedure, the storage tank may be made of glass or metal (preferably stainless steel). The inner surfaces of the tank 10 and the internal structures are coated with a material common to all the members as tetrafluoro ethylene ($C_2F_4$) also known as Teflon. The immiscible fluids used are water and a solution of chloroform and hexane. Under these conditions, the solution of chloroform and hexane preferentially wets the surface of the internal structures and tank. This arrangement provides a near-zero-contact angle at the interface of the two fluids. The film of Teflon is particularly desirable in that it is sufficiently transparent to permit visual observation of the storage apparatus in operation when glass is used for the components.

The chloroform/hexane solution is mixed to a density near that of water and the two fluids are filled in the tank to the desired proportions. The final density of the system is accurately achieved by adding drops of either the more dense chloroform or less dense hexane until neither liquid constituent exhibits a tendency to rise. In this condition the interface does not vary with its orientation in space. It should be noted, since the two liquids have different densitytemperature characteristics thermal gradients in the system environment cause density imbalances and interface distortion. Nevertheless, an environment controlled to within a few degrees (such as most roomtemperature environments) is satisfactory for low-g simulations of the apparatus of the invention.

Notwithstanding the above-mentioned undesirable effects of thermal gradients, the thermal density shift can be used to an advantage. A thermally controlled chamber may be used to simulate low-g environments for the apparatus of the invention such as those created during spacecraft engine thrust periods. By raising or lowering the temperature, low level acceleration forces are simulated. The effective acceleration or g-level being simulated can be calibrated by using a reference interface of the same liquids in the straight section of a cylinder. Both are placed in a temperature controlled chamber and the chamber temperature is adjusted to different values. By comparing the meniscus shape in the standard cylinder with known Bond Number ($B_0$) curve, the effective g-level or acceleration force may be determined. Thus, the neutral buoyancy technique according to the invention can also demonstrate static interfaces occurring during the thrusting and other perturbation periods during a spacecraft mission.

It should now be appreciated and understood, that a storage container of a two phase fluid made in accordance with the present invention provides the means for supplying one of the fluids substantially continuously until depleted from the container.

The compartmentalized structure in combination with the selective screening within the feeder tubes and the outlet screen provides a gas-free liquid communication path which causes the gas-free liquid to flow on demand to an outlet port. The wettability of the desired liquid being greater than the wettability of the other liquid establishes an optimum interface configuration between the liquid based on capillary action. For use of the invention in low or zero-g environments, such as for orbiting satellite applications, the liquid for supply is a propellant such as hydrazine, and the other fluid is a pressurant such as nitrogen. The two fluids are immiscible and their relative densities have no effect on the interface. For use in gravity environment it is required that the fluids have substantially equal densities so that the gravity effect is neutralized. The fluid desired for supply perferably has a greater wettability than the other immiscible fluid which serves to expel the supplied fluid and must have a preferential wetting property to the container and other structures within the tank (i.e. the feeder tubes, barrier, outlet screen shell). Thus, the supply liquid must have relatively better wettability to the surfaces as compared to the wettability of the other fluid.

Although the invention is primarily intended for use as a storage container of a propellant for orbiting spacecraft or satellites, it should be apparent that the invention may be used for the supply of a selected one of two fluids in the manner described.

What is claimed is:

1. A storage container comprising:
   an input port for admitting two fluids one of said fluids being a liquid and having a preferential wetting property greater than the other of said two fluids;
   an outlet port for withdrawing a selected one of said two fluids;
   first partition means having opening means and disposed within said container for partitioning said container into first and second cpmpartments;
   second partition means disposed within said container for partitioning said second compartment to form an inner and an outer compartment relative to said container;

tubular means arranged in communication with said opening means for providing fluid communication between said first and second compartments, said tubular means having a sidewall foraminous surface with apertures to support capillary wicking of liquid threthrough;

said foraminous sidewall facing the inner surface of said container and spaced therefrom a distance sufficient to support a capillary fillet of a liquid.

2. A storage container according to claim 1 wherein said tubular means includes two tubular members rectangular in cross section, each being respectively disposed to extend from a portion of said container adjacent said inlet port to said first partition means to provide a fluid path from said first compartment to said second compartment.

3. A storage container according to claim 2 wherein each of said tubular members are each provided with a pair of spaced foraminous end walls, forming a capillary gap defined by the spacing between the end walls to inhibit the flow of a gaseous fluid into each of said members when wetted with a liquid fluid, the apertures of said foraminous end walls being relatively larger than the apertures of the foraminous side wall surfaces of said members.

4. A storage container according to claim 1 wherein siad first partition means is a plate extending across the interior of said container.

5. A storage container according to claim 1 wherein siad first partition means is a plate formed of foraminous material.

6. A storage container according to claim 1 wherein said container is a hollow sphere and said second partition means is a portion of a spherical surface formed of foraminous material disposed within said container and spaced from the inner wall of said container a distance sufficient to support a capillary flow of liquid fluid.

* * * * *